UNITED STATES PATENT OFFICE

WILLARD F. GREENWALD, OF NEW YORK, N. Y., ASSIGNOR TO WEISBERG & GREENWALD, INC., OF NEW YORK, N. Y., A CORPORATION OF NEW YORK

METHOD OF PREPARING SYNTHETIC RESINS

No Drawing.  Application filed June 6, 1930. Serial No. 459,617.

This invention relates to synthetic resins and particularly to an improved method of preparing such products.

Synthetic resins have been prepared heretofore by the reaction of phenol or its homologues with formaldehyde. Various catalogues or condensing agents including acids and bases have been used to facilitate the reaction. Among the common catalysts are sodium hydroxide, ammonia, etc.

It is the object of the present invention to provide an improved method and a product having rapid curing properties and other qualities which make the product superior to synthetic resins as prepared by well-known methods.

I have discovered that the alcohol substituted amines of the aliphatic series, that is, amines in which the hydrogen is replaced by alcohol groups such as methyl, ethyl, propyl and higher ones, and particularly mono-, di- and tri-substituted amines of methyl, ethyl, propyl, and higher alcohols and mixtures thereof are particularly adapted for use as catalysts in the preparation of synthetic resins, and that resins produced by the reaction of phenol and formaldehyde in the presence of such amines or mixtures have improved properties and characteristics.

In carrying out the invention, I mix phenol or its homologues and formaldehyde or its polymers or other agent adapted to effect resinification, add a small proportion of an alcohol substituted amine of the aliphatic series as a catalytic agent, and subject the mixture to heat. The phenol and formaldehyde should be mixed in approximately the molecular proportions required for the reaction, although an excess of formaldehyde can be used. Equal volumes of commercial phenol and commercial formaldehyde afford a satisfactory mixture.

When such a mixture is heated to a temperature of approximately 100° C., the resulting reaction produces two liquids which readily stratify. The supernatant liquid is an aqueous solution which includes the water resulting from the reaction or introduced with the reagents. The heavier liquid is a viscous or semi-plastic material and is the basis of the synthetic resin. The aqueous solution is withdrawn and rejected and the heavy liquid is preferably heated slightly to separate any remaining water therefrom.

The viscous material resulting from the primary reaction is easily soluble in or miscible with alcohol, acetone, phenol and similar solvents or mixtures thereof. After heating to remove the water it becomes more viscous, approaching a semi-plastic stage in which it is insoluble or incompletely soluble in alcohol but is still partially solube in acetone or a mixture of acetone and alcohol. It may be subjected to further treatment by heating and is thereby transformed into a hard body which is insoluble in alcohol and acetone, infusible, resistant to alkalis, acids and the like, and is unaffected by moisture. This product is suitable for many purposes and is adapted particularly for the manufacture of products which are molded, by introducing the semi-plastic material into suitable molds and then heating the molds to convert the material into the infusible resin.

In using the material, the liquid or semi-plastic condensation product may be mixed with various other solid materials including inorganic and organic materials such as wood flour, cotton linters, sulphite pulp and asbestos. Numerous compounds may be produced thus, the properties of which will vary and which are adapted for numerous uses. Various liquids or semi-liquids, including plasticizing agents, can be mixed with the resins. The alcohol-substituted amines of the aliphatic series impart exceptional properties to the resin and afford particularly a marked increase in flow of the liquid or semi-plastic condensation product which is thus peculiarly adapted for molding.

Instead of ordinary phenol, I may use cresol and its homologues or other phenolic bodies. I may also use in place of commercial formaldehyde a solution of anhydrous formaldehyde in phenol or the polymer of formaldehyde, which, upon heating, breaks down into anhydrous formaldehyde. As a catalyst I prefer to employ triethanolamine. The commercial product sold under that name is a mixture of mono-, di- and tri-ethanol substituted amine and is suitable for the purpose of the invention.

As a specific example of the invention, I may use a mixture comprising—

| | Parts |
|---|---|
| Cresol | 100 |
| Formaldehyde | 100 |
| Triethanolamine | 7½ |

This mixture is subjected in any suitable vessel to a temperature of approximately 100° C. I prefer to employ an autoclave, but the mixture may be heated in any ordinary vessel having a return condenser in order to avoid loss of materials and variation in the proportions in the mixture. After heating the mixture for approximately sixty minutes, it is permitted to settle and the supernatant aqueous solution is withdrawn. The resulting viscous liquid can then be subjected preferably under vacuum to heat for a brief period at a temperature sufficient to remove any remaining water.

The resin can be incorporated with wood flour, fibrous materials or other suitable fillers, for example, by mixing the fillers with an alcoholic solution of the resin and removing the solvent, or by incorporating the resin with the filler on a calender. The resulting product is then ground and placed in molds in which it is subjected to heat and pressure sufficient to harden the resin. Or the resin may be disposed in molds without the filler and subjected to a suitable temperature, e. g., 100 to 140° C. Heating at this temperature rapidly solidifies and hardens the resin, which, when removed from the molds, is a hard, compact and homogeneous mass which is insoluble in the usual solvents and infusible. It may be employed for any of the purposes for which synthetic resins have been used heretofore, either as a resinous material or in admixture with fibres or pulverized solids which are added to the liquid or viscous material before finally heating to convert the resin into a solid condition.

The resin prepared as described cures more rapidly than resins produced heretofore by the reaction of phenol with formaldehyde. It flows more readily and is better adapted for molding and it has other advantageous properties and characteristics.

It is to be understood that various changes may be made in the composition and proportions of the ingredients as herein described.

I claim:

The method of preparing synthetic resins which comprises heating cresol, formaldehyde and triethanolamine, in which the cresol, formaldehyde and triethanolamine are in approximately the following proportions by weight, cresol 100 parts, formaldehyde 100 parts and triethanolamine 7½ parts.

In testimony whereof I affix my signature.

WILLARD F. GREENWALD.